UNITED STATES PATENT OFFICE 2,675,381

HETEROCYCLIC AMINOALKYL IMIDAZO-LIDINES AND HEXAHYDROPYRIMIDINES

W E Craig, Philadelphia, and John O. Van Hook, Roslyn, Pa., assignors to Rohm & Haas Company, Philadelphia, Pa., a corporation of Delaware No Drawing. Application January 29, 1953, Serial No. 334,077

6 Claims. (Cl. 260—247.5)

This invention concerns compounds of the formula

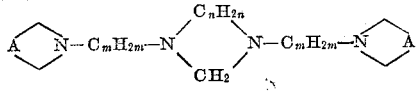

wherein $m$ is an integer from two to five, $n$ is an integer of two to three, there being chains of at least two carbon atoms between nitrogen atoms, and A is a saturated divalent aliphatic chain forming a monocyclic heterocycle with the nitrogen. These compounds have fungicidal, bactericidal, and antiviral properties. Some are insecticides. These compounds are also useful as plasticizers and as anticorrosion agents.

These compounds are prepared by reacting by condensing together formaldehyde and an N,N'-bis(heterocyclic aminoalkyl) alkylenediamine, in which the alkylene group contains two to three carbon atoms. The reaction is carried out between 0° and 140° C., desirably in the presence of an inert organic volatile solvent, particularly one which forms an azeotrope with water, such as benzene, toluene, xylene, or naphtha.

The N,N'-bis(heterocyclic aminoalkyl)alkylenediamines are readily prepared from amines of the formula

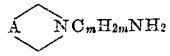

and an alkylene dihalide of two to three carbon atoms. Ethylene dichloride, propylene dibromide, and trimethylene dibromide serve well for this purpose. The amine should be mixed in excess with the alkylene dihalide and the mixture heated between 50° and 150° C. A base is used to take up the hydrogen halide formed, a solution of sodium hydroxide, for example, being useful for this purpose. Excess amine is taken off by distillation and the complex polyamine formed is usually recovered as a residue. In some cases it may be distilled.

Various methods have been shown in the chemical art for preparing diamines of the above type and these are adaptable to the introduction of different tertiary amine groups and different alkylene chains or the equivalent cycloalkylene group. Other methods follow conventional procedures for introducing these parts in the diamine structure. Some of the diamines have been made available by chemical manufacturers. Others can be prepared by methods such as are shown in Journal of the American Chemical Society 63, 156; 66, 725; 67, 686; 68, 1859, and 72, 81.

As typical of the heterocyclic aminoalkylamines which may be taken for reacting with an alkylene dihalide of two to three carbon atoms there may be mentioned morpholinoethylamine, morpholinopropylamine, morpholinobutylamine, morpholinopentylamine, 3-methylmorpholinoethylamine, 3,5-dimethylmorpholinoethylamine, 3,5-dimethylmorpholinopropylamine, pyrrolidinoethylamine, pyrrolidinopropylamine, pyrrolidinopentylamine, piperidinoethylamine, piperidinopropylamine, 2-methylpiperidinobutylamine, piperidinopentylamine, 2,6-dimethylpiperidinopentylamine, thiamorpholinopropylamine, N-methylpiperazinoethylamine, N-methylpiperazinopropylamine, N-methylpiperazinopentylamine, and other N-alkylpiperazinoalkylamines, particularly where the N-alkyl group on the piperazine ring is lower alkyl.

When these amines are reacted with an alkylene dihalide there results such polyamines as N,N'-bis(morpholinoethyl) ethylenediamine, N,N'-bis(morpholinopropyl) ethylenediamine, N,N'-bis(morpholinopentyl) ethylenediamine, N,N'-bis(morpholinoethyl)-1,2-propylenediamine, N,N'-bis(morpholinopropyl) - 1,3 - propanediamine, N,N'-bis(thiamorpholinoethyl) ethylenediamine, N,N'-bis(thiamorpholinopropyl)propylenediamine, N,N'-bis(3,5-dimethylmorpholinopropyl)-propylenediamine, N,N'-bis(pyrrolidinoethyl)ethylenediamine, N,N'-bis(pyrrolidinopropyl) - 1,3-propanediamine, N,N'-bis(piperidinoethyl)ethylenediamine, N,N'-bis(piperidinopropyl) ethylenediamine, N,N'-bis(piperidinopropyl) propylenediamine, N,N'-bis(piperidinopentyl)-1,3-propanediamine, N,N'-bis(N-methylpiperazinopropyl)ethylenediamine, etc.

Formaldehyde may be used in the form of aqueous 30% to 50% solutions or in the form of a revertible polymer or as a mixture of these forms. Desirably formaldehyde is used in excess of theoretical requirements.

One of the above complex diamines and formaldehyde are mixed. The reaction is preferably started at low temperatures and completed by heating. Heating under reflux with removal of water is a particularly convenient way of carrying on the reaction. The reaction mixture is stripped of volatile material to leave a residue which is essentially the desired end product. In some cases it may be desirable to distill the product at low pressures.

The following examples give additional details of procedure and illustrate the preparation of compounds of this invention. Parts are by weight.

*Example 1*

A portion of 260 parts of morpholinoethylamine is stirred and heated to about 70° C. and thereto there is slowly added 50 parts of ethylene dichloride. The mixture is stirred and heated with the temperature thereof being carried to about 130° C. The mixture is cooled below 100° C. and treated with 100 parts of aqueous 50% sodium hydroxide solution. The organic layer which forms is separated and distilled. At 45°–100° C./1 mm. there is recovered unreacted morpholinoethylamine. At 160°–190° C./0.3 mm. there is obtained a fraction consisting of bis(morpholinoethyl)ethylenediamine in a yield of 29%. Analysis of this material shows a nitrogen content of 19.6% (theory 19.6%).

There are mixed 35 parts of this product and 13 parts of aqueous 37% formaldehyde solution. About 80 parts of benzene are added and the resulting mixture is heated under reflux with trapping of water. After four hours of heating the reaction mixture is stripped, being carried to 130° C./3 mm. The residue thus obtained has a nitrogen content of 18.6% and yields 11% of formaldehyde, thus corresponding in composition to N,N'-bis(morpholinoethyl)imidazolidine, for which corresponding theoretical values are 18.8% and 10.1%. This product has a refractive index, $n_D^{20}$, of 1.5103.

Example 2

To 115 parts of 3-morpholinopropylamine, which is stirred and heated to 70° C. there is added ethylene dichloride to an amount of 22 parts. The mixture is heated with temperatures increasing to 140° C. and then cooled below 100° C. It is made alkaline with aqueous 50% sodium hydroxide solution and the organic layer which forms is separated. It is fractionally distilled. At 60°–80° C./0.3 mm. unreacted morpholinopropylamine is taken off. Then, the main fraction is taken at 186°–191° C./0.3 mm. The yield is 45%. The product contains 16.8% of nitrogen and yields 8.3% formaldehyde, corresponding in composition to N,N-bis(morpholinopropyl)imidazolidine. The theoretical requirements for nitrogen and formaldehyde for this compound are 17.2% and 9.2%, respectively.

This compound, as other compounds of this invention, are quite effective antiviral agents as demonstrated by their control of virus injected into chick embryos.

Example 3

To 130 parts of morpholinoethylamine heated to about 70° C. there is added with stirring 50 parts of trimethylene dibromide, while the temperature rises to about 125° C. The mixture is then heated for two hours at 130° to 140° C., cooled and treated with aqueous 50% caustic soda solution in excess. The resulting organic layer is taken, dried, and distilled. At 45°–100° C./0.4 mm. unreacted starting amine is recovered. At 175°–193° C./0.3 mm. the desired product is obtained in a yield of 51%. It corresponds in composition to N,N'-bis(morpholinoethyl)-1,3-propylenediamine, having a nitrogen content of 18.9% (theory 18.7%).

There are mixed 60 parts of this product and 20 parts of aqueous 36% formaldehyde solution. The reaction mixture is treated with a close-cut naphtha and heated under reflux with removal of water. The reaction product is then stripped by heating to 140° C./1 mm. to yield a light colored oil. This contains 17.7% of nitrogen and yields 9.2% formaldehyde, corresponding in composition to N,N'-bis(morpholinoethyl)hexahydropyrimidine. Theoretical nitrogen and formaldehyde values are 18% and 9.6%, respectively. The refractive index is 1.5095 at 20° C.

Example 4

In the same way there are reacted 58 parts of morpholinopropylamine and 20 parts of trimethylene dibromide. Unreacted starting amine is taken off in a fraction distilling at 70°–80° C./0.2 mm. and bis(morpholinopropyl)-1,3-propylenediamine is taken at 160°–220° C./0.1 mm. The fraction as taken contains 16.7% of nitrogen (theory 17.1%).

In the same way as described above 25 parts of this product and 10 parts of 37% formaldehyde solution are mixed. Benzene is added and water is taken off by azeotropic distillation. The reaction mixture is stripped by heating to 140° C./1 mm. It contains 16.3% of nitrogen and yields 8.5% formaldehyde, corresponding in composition to N,N'-bis(morpholinopropyl)hexahydropyrimidine, for which the theoretical values are 16.5% and 8.8%, respectively.

This compound exhibits definite synergism in the knock down of insects with pyrethrum-containing insecticides.

Example 5

There are reacted together as above 120 parts of 5-pyrrolidinopentylamine and 20 parts of ethylene dichloride. The reaction mixture is made alkaline with aqueous sodium hydroxide solution, washed, dried, and distilled. After unreacted starting material is taken off, a fraction is taken at 140°–160° C./<1 mm. which corresponds in composition to N,N'-bis(pyrrolidinopentyl)ethylenediamine. It contains 16.5% of nitrogen (theory 16.6%).

This reaction product is reacted with an excess of aqueous 37% formaldehyde solution. Water is taken off azeotropically with refluxing benzene. The reaction product is then stripped and part of the residue is distilled at 130°–150° C./1 mm. The product contains 15.9% of nitrogen and yields 8.4% formaldehyde, corresponding in composition to N,N'-bis(pyrrolidinopentyl)imidazolidine, for which the theoretical nitrogen is 16.0% and the theoretical formaldehyde is 8.6%.

In the same way other pyrrolidinoalkyl substituted imidazolidines and hexahydropyrimidines are prepared. The alkyl substituent is readily varied from ethyl to pentyl. In place of the pyrrolidine heterocycle there may be used the piperidine group. The resulting compounds are very similar in properties.

Example 6

In a comparable way N-methylpiperazinopropylamine is reacted with ethylene dichloride to form N,N'-bis(N-methylpiperazinopropyl)ethylenediamine, which is collected in a fraction distilling between 140° and 180° C. at about one mm. pressure and containing 24.7% of nitrogen.

This compound is reacted with formaldehyde as in previous examples to give N,N'-bis(N-methylpiperazinopropyl)imidazolidine, which is collected as a stripped residue containing 23.8% of nitrogen and yielding 8.2% of formaldehyde. Theoretical values are 23.9% and 8.5%.

In the same way other N-alkylpiperazino derivatives, whether imidazolidines or hexahydropyrimidines, can be prepared.

The compounds of this invention are characterized by marked antiviral activity as demonstrated by control of virus implanted in chick embryos. The compounds are closely related structurally in having a saturated heterocycle with two ring nitrogens which carry aminoalkyl substituents, the amino groups thereof being parts of five- or six-sided heterocyclic amine groups.

We claim:

1. As new chemical substances, compounds of the formula

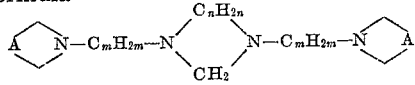

wherein $C_nH_{2n}$ and $C_mH_{2m}$ are alkylene chains of at least two carbon atoms each, $n$ being an integer of two to three and $m$ being an integer from two to five, and

is a heterocyclic radical selected from the class consisting of morpholino, lower alkyl substituted morpholino, pyrrolidino, piperidino, lower alkyl substituted piperidino, thiamorpholino, and N-lower alkyl piperazino groups.

2. As a new chemical substance, N,N'-bis(morpholinoethyl)imidazolidine.

3. As a new chemical substance, N,N'-bis(morpholinoethyl)hexahydropyrimidine.

4. As a new chemical substance, N,N'-bis(morpholinopropyl)imidazolidine.

5. As a new chemical substance, N,N'-bis(morpholinopropyl)hexahydropyrimidine.

6. As a new chemical substance, N,N'-bis(pyrrolidinopentyl)imidazolidine.

No references cited.